A. L. CLARK.
TRUCK.
APPLICATION FILED SEPT. 18, 1908.

1,037,131.

Patented Aug. 27, 1912.
2 SHEETS—SHEET 2.

Witnesses
Linda Scharff
Richard E. Butler

Inventor
Alfred L. Clark

By
M. M. Cady
Attorney

UNITED STATES PATENT OFFICE.

ALFRED L. CLARK, OF DUBUQUE, IOWA.

TRUCK.

1,037,131.

Specification of Letters Patent. Patented Aug. 27, 1912.

Application filed September 18, 1908. Serial No. 453,708.

*To all whom it may concern:*

Be it known that I, ALFRED L. CLARK, a citizen of the United States, residing at Dubuque, in the county of Dubuque and State of Iowa, have invented certain new and useful Improvements in Trucks, of which the following is a specification.

My invention relates to improvements in trucks with special reference to those in which a plurality of wheels linked together form one flexible wheel, traveling around a bed, and it consists in the novel construction and combination of parts which will be fully shown and described in the following specification when read in connection with the drawings accompanying the same and forming a part thereof.

Figure 1:
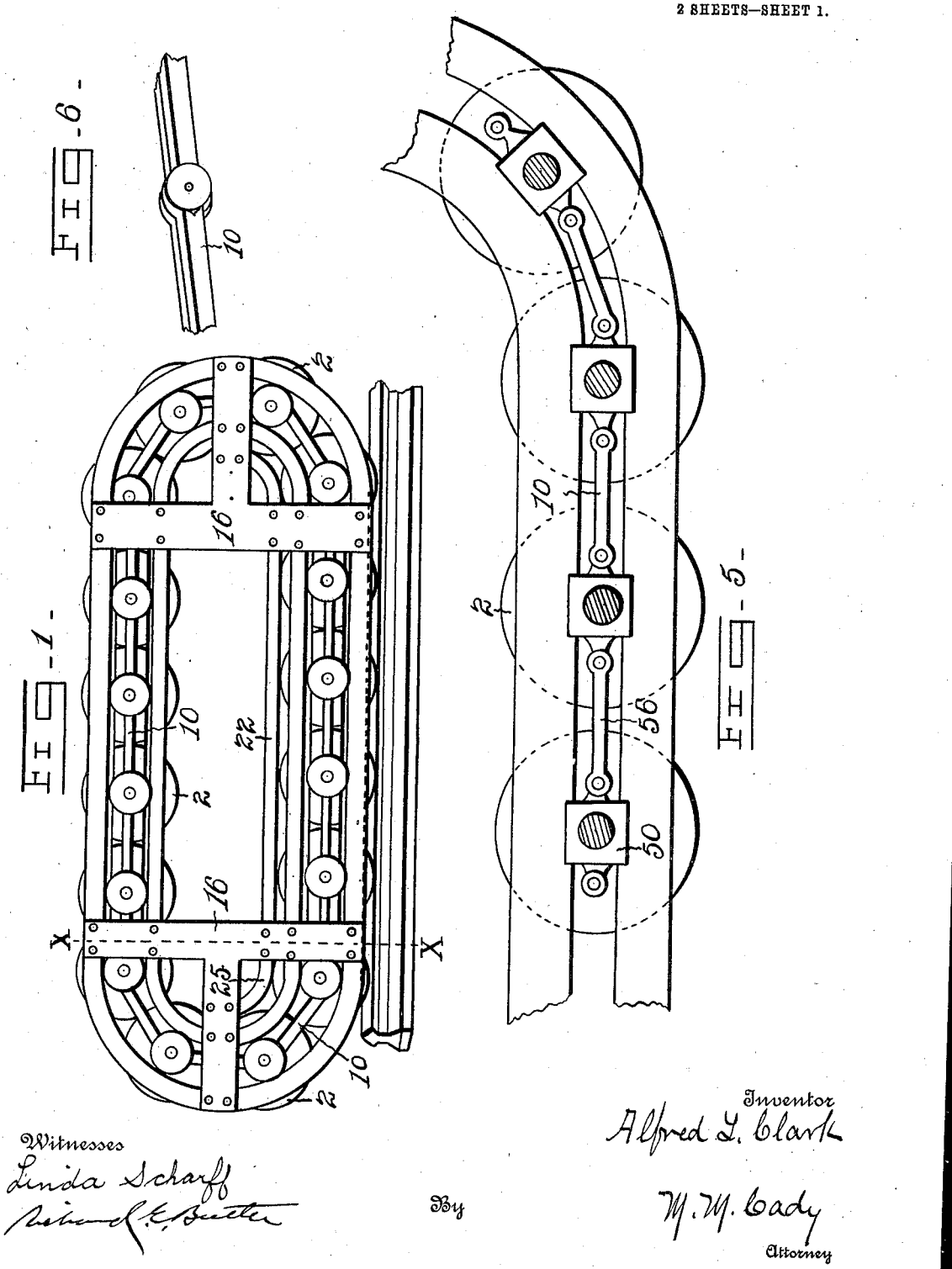
Figure 2:
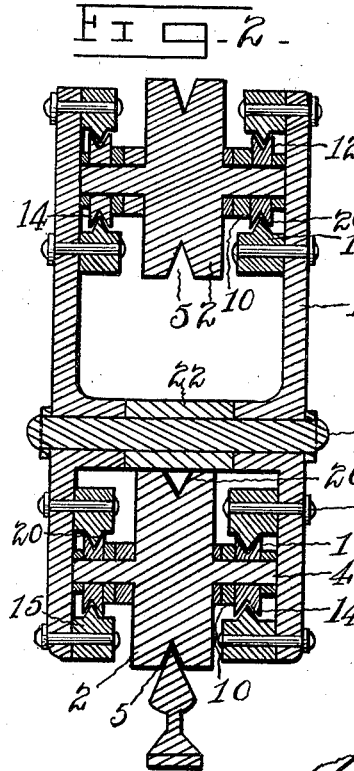
Figure 3:
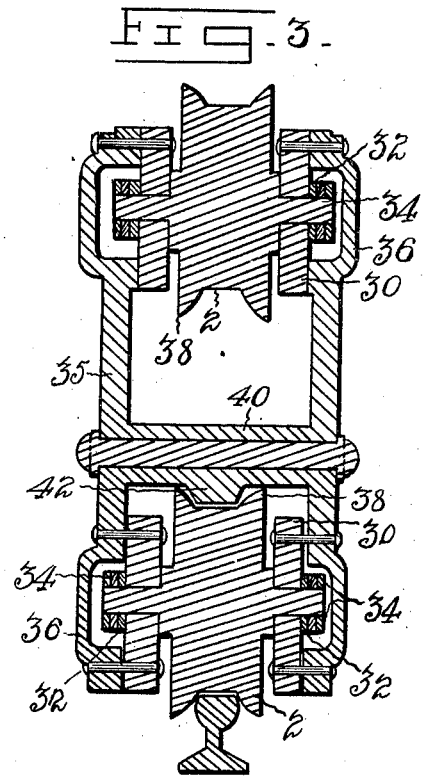
Figure 4:
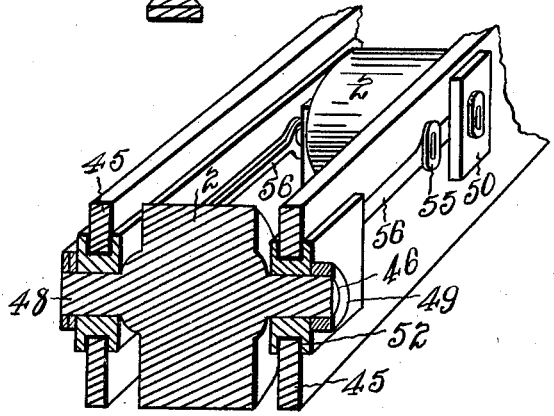
Figure 7:
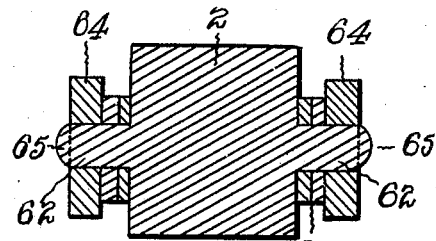

Figure 1, is a plan view of one side of my truck. Fig. 2, is a vertical section through the line X—X of Fig. 1. Fig. 3, is a sectional view of another form of guiding the wheels. Fig. 4, is an end view of a section of still another form of guiding the wheels. Fig. 5, is a side view of Fig. 4, showing the side guide. Fig. 6, is a perspective view of the links. Fig. 7, is a modified form of Fig. 4.

Like characters of reference denote corresponding parts in each of the figures.

Referring to the drawings, 2 designates the wheels each of which is provided with an axle 4, and a groove 5 around its center. The wheels are linked together by the links 10, which are pivoted around the axle 4 next to the hub or body of the wheel. Upon the same axle next to the link is mounted a supplemental guide wheel 12, which has also a groove 14 around the center of its periphery. The wheels 12 serve not only as bearings but also as guides for the wheels 2.

Above and below the wheels 12 are guides 15 securely bolted to the frame 16 by the bolts 18 and provided with a projection 20 which engages the groove or depression 14 in the wheel 12. These guides extend around the bed 22 but out of contact with the bed when above it and serve not only as a guide in directing the movement of the wheels but also as a track on which the supplemental wheels 12 travel when above the bed and keep the wheels and axles out of contact with the bed when they are above the latter.

The bed 22 on which the burden to be carried rests is rigidly bolted within the frame by bolts 24 passing through the bed and frame 16 on each side and extends nearly the length of the truck and is turned up at both ends 25. The bed is also provided with a longitudinal projection 26 which engages the groove 5 in the wheels 2 and assists in guiding the wheels 2 and prevents any lateral movements of the wheels.

It will be observed that the burden will be carried upon the periphery of the wheels 2, and that the friction on the axles will be reduced to the minimum; as they bear on the supplemental guide wheels 12; furthermore the wheels 2 are so completely guided by the guide bars 15 and by the bed, that there is little possibility of any sidewise movement. It will also be seen that the bed, being only a section or half bed and only along over the wheels as they travel on the track and are about to approach the track, will greatly decrease the weight of the truck and yet the wheels will be guided by the upper guides 15 and always maintain the same relation to each other by means of the links 10, and, when traveling over the bed, will not contact with it but will travel along on the guides as tracks.

In Fig. 3, the wheels 12 are dispensed with and the axles of the wheels 2 travel between the guides 30, and the links 32 are pivoted to the axles outside of the guides. There is also a plate or cap 34 on the outer end of the axle and the frame 35 is curved outwardly at 36 over the end of the axle to guard it from injury. The wheel 2 is hollowed out in its periphery leaving a flange 38 on each side and between the two flanges the body of the wheel travels on the track. The bed 40 used herewith has a raised portion 42 adapted to engage the depressed space in the wheel but only extends over the top of the wheels that travel on the track, and those about to engage or leave the track. When the wheels are traveling over the bed, they are sustained on the lower guide bars 30.

Fig. 4, shows the wheels 2 traveling between two sets of guides 45, one set on each side. The ends 46 of the axles 48 may have thereon a cap or screw 49. Surrounding the axles are slide boxes 50 provided with longitudinal grooves 52 in which are the guides 45 with the sides of the grooves extending on opposite sides of the guides 45. The boxes are linked together by links 56 pivoted to ears 55 secured to the boxes 50.

In Fig. 7 the slide boxes 50 shown in Figs.

4 and 5 are dispensed with and the links 60 are pivoted on the axle 62 between the guides 64 and the wheel 2 and a cap or cover 65 is secured to the outer ends of the axle which arrangement prevents the axle from any endwise movement.

Having now described my invention what I claim is:

1. In a device of the class described, a plurality of wheels each provided with an axle and linked together, a bed sustained upon the periphery of the wheels, a supplemental guide wheel on each end of the axle, and guides upon which the guide wheels travel and by which the wheels are guided.

2. In a device of the class described, a bed, a plurality of wheels adapted to travel around the bed, guides on opposite sides of the wheels and above and below the axles, and means attached to the axles to prevent lateral movement of the wheels.

3. In a device of the class described, a frame, a bed secured to the frame and provided with a longitudinal projection on its under surface and a plurality of wheels provided with grooves in their tread adapted to be engaged by the projection in the bed and guide the wheels in their travel.

4. In a device of the class described, a bed, a plurality of wheels carrying the bed, and means for carrying the wheels out of contact with the bed when traveling above the bed.

5. In a device of the class described, a frame, a bed secured to the frame, a plurality of wheels linked together and adapted to carry the bed, and means secured to that part of the frame on which the wheels travel over the bed for carrying the wheels out of contact with the bed while traveling above the same.

6. In a device of the class described, a frame, a bed secured to the frame, a plurality of wheels adapted to sustain the bed on their peripheries, and a track secured on each side of the wheels for carrying the wheels out of contact with the bed while traveling above the bed.

7. In a device of the class described, a frame, a bed secured to the frame, a plurality of wheels each provided with an axle, and a track secured to the frame upon which the axles of the wheels travel above the bed and out of contact with the bed.

8. In a device of the class described, a frame, a bed secured to the frame, a plurality of wheels provided with axles and linked together and adapted to surround and sustain the bed when traveling beneath it, guide wheels secured upon the axles and guides engaging the guide wheels for guiding the wheels and carrying the wheels out of contact with the bed while traveling over the bed.

9. In a device of the class described, a frame, a bed secured to the frame and provided with a longitudinal projection on its under surface, a plurality of wheels provided with grooves in their tread in which the projection in the bed engages while the bed is sustained on the wheels, and guides for directing the travel of the wheels and for carrying the wheels over the bed and out of contact with the bed.

10. In a device of the class described, a frame, a bed secured in the frame and provided with a longitudinal projection on the under side of the bed, a plurality of wheels having axles and linked together and provided with grooves or depressions with which the projection in the bed engages, guide wheels on the axles and guides engaging the guide wheels and surrounding the bed to control the travel of the wheels and provide a track for carrying the wheels as they travel above the bed and out of contact with the bed.

11. In a device of the class described, a frame, a bed secured to the frame, a plurality of wheels adapted to travel around the bed and provided with axles, a guide wheel on each axle near the ends and each provided with a groove in the tread to guide the direction of the wheels and carry the wheels while traveling over the bed and out of contact with the bed.

12. In a device of the class described, a frame, a bed secured to the frame and provided with a longitudinal projection on the under side of the bed, a plurality of wheels having axles linked together and provided with grooves or depressions in the tread of the wheels adapted to be engaged by the projection in the bed, grooved guide wheels on the outer ends of the axles and a plurality of guides encircling the bed on each side of the wheel and serving as a guide to the wheels and as a track for carrying the wheels over the bed and out of contact with the upper surface of the bed.

In testimony whereof I affix my signature, in presence of two witnesses.

ALFRED L. CLARK.

Witnesses:
M. M. CADY,
R. SULLIVAN.

---

Copies of this patent may be obtained for five cents each, by addressing the "Commissioner of Patents, Washington, D. C."